United States Patent [19]

Kiuchi et al.

[11] Patent Number: 5,579,493
[45] Date of Patent: Nov. 26, 1996

[54] SYSTEM WITH LOOP BUFFER AND REPEAT CONTROL CIRCUIT HAVING STACK FOR STORING CONTROL INFORMATION

[75] Inventors: Atsushi Kiuchi, Kunitachi; Tetsuya Nakagawa, Koganei, both of Japan

[73] Assignee: Hitachi, Ltd., Tokyo, Japan

[21] Appl. No.: 354,166

[22] Filed: Dec. 8, 1994

[30] Foreign Application Priority Data

Dec. 13, 1993 [JP] Japan .................................. 5-311750

[51] Int. Cl.⁶ .................................................. G06F 9/40
[52] U.S. Cl. .......................... 395/375; 395/800; 395/750; 364/DIG. 1
[58] Field of Search .................................. 395/375, 800, 395/452

[56] References Cited

U.S. PATENT DOCUMENTS

| | | | |
|---|---|---|---|
| 3,593,306 | 7/1971 | Toy | 395/375 |
| 3,928,857 | 12/1975 | Carter et al. | 395/250 |
| 4,626,988 | 12/1986 | George | 395/375 |
| 5,113,370 | 5/1992 | Tomita | 395/375 |
| 5,155,817 | 10/1992 | Kishigami et al. | 395/375 |
| 5,333,280 | 7/1994 | Ishikawa et al. | 395/375 |
| 5,463,737 | 10/1995 | Saitoh | 395/496 |
| 5,493,667 | 2/1996 | Huck et al. | 395/452 |
| 5,511,178 | 4/1996 | Takeda et al. | 395/452 |
| 5,515,519 | 5/1996 | Yoshioka et al. | 395/375 |

OTHER PUBLICATIONS

Furht et al., "A Compiler–Directed Cache Strategy for GaAs Microprocessor Architectures", IEEE, 1988, pp. 186–192.

*Primary Examiner*—William M. Treat
*Attorney, Agent, or Firm*—Antonelli, Terry, Stout & Kraus

[57] ABSTRACT

A low-power data processor in which memory access for reading out an instruction module to be repeatedly executed is controlled to decrease the power consumption of the data processor. The data processor comprises an instruction buffer formed of, for example, a CMOS device operable with low power consumption, the instruction buffer storing the instruction module to be repeatedly executed and being accessed in lieu of an instruction memory, and a repeat control circuit controlling storage of the instruction module in the instruction buffer, so that part of the instruction module ranging from the foremost instruction of the instruction module and corresponding to the capacity of the instruction buffer is stored in the instruction buffer, thereby decreasing the corresponding amount of power consumed for access. The repeat control circuit includes a stacking area so that, even when the instruction module has a multi nested loop structure, that part of the instruction module can be held in the instruction buffer together with the information informing the stored address of the instruction module so as to deal with the instruction module of the multi nested loop structure.

8 Claims, 3 Drawing Sheets

SYSTEM WITH LOOP BUFFER AND REPEAT CONTROL CIRCUIT HAVING STACK FOR STORING CONTROL INFORMATION

BACKGROUND OF THE INVENTION

This invention relates to a data processor for executing a sequential in order a program which is held in, for example, an instruction memory, such as, a built-in program ROM, and more particularly to a low-power data processor which has a built-in battery and is suitable for use in, for example, various kinds of portable media terminals required to operate with low power consumption.

A portable terminal using technology for processing an analog signal is now commonly used in the form of, for example, a mobile telephone. When an expected increase in the number of users and an expected future request for a portable terminal capable of dialing with multimedia applications are taken into consideration, it is inevitable that such a portable terminal must necessarily handle a digital signal, and a portable terminal that can actually handle a digital signal has been already put into practical use. However, in the case of a terminal using a digital signal processor developed according to present prior art technology, its built-in battery cannot necessarily operate over a satisfactorily long time in view of the difficulty in reducing its power consumption.

As for the technique for extending the useful service life of the built-in battery of a terminal using a digital signal processor, it is a matter of first consideration to increase the capacity of the battery itself. On a other hand, the similar result can also be attained when the same processing can be executed by consumption of a lesser amount of power. Further, unlike the case of increasing the capacity of the battery, the latter case is advantageous in that there is no need for increasing the volume and weight of the terminal itself, and the amount of generated heat is rather decreased due to the reduced amount of power consumption, thereby improving the usability of the terminal.

For the purpose of decreasing the amount of power consumption required for such processing, an improvement in the processing algorithm is effective, and, when the same algorithm can be realized with consumption of a lesser amount of power during execution, such an improvement is also very effective. Digital data processing is carried out by a microprocessor designed for digital signal processing. Basically, the method of digital data processing includes reading out a pre-programmed program module from a memory, then decoding its instruction code, and finally executing the instruction. In the case of an ordinary general-purpose microprocessor, the system is such that a general-purpose external memory stores the program, and the instructions are successively read out to be fetched by the microprocessor. However, in the case of a microprocessor used for processing a digital signal, especially, in the case of a microprocessor incorporated in a portable terminal, it is a common practice to build the program memory in the microprocessor so as to reduce the overall volume of the hardware as much as possible. In a microprocessor of the type having a built-in program memory, a considerable proportion of the power is consumed during reading out of the program from the program memory, and the power consumption required for execution of the same program can be reduced when the number of program memory accesses during execution of the program can be decreased.

Various kinds of digital signal processing including speech signal processing in a mobile phone are featured in that repeat processing, which involves repeatedly executing a program module within a range of from several steps to several tens of steps at the most, is frequently carried out. The proportion of such processing in the overall processing is at least 20% and sometimes exceeds 50%. Generally, this repeat processing is realized by branching, a specified number of times, in the program to the head address of the program module to be repeatedly executed. However, execution of such a conditional branch instruction each time is wasteful. Thus, in the case of the prior art processor used for processing a digital signal, the manner of control now employed is such that an instruction specifying the number of instruction steps to be repeated and the number of times the module is to be repeated is provided ahead of the program module to be repeatedly executed, and, when the end of the program module is reached, the instruction returns automatically to the head address of the program module so as to cancel the overhead attributable to the execution of the branch instruction.

Anyway, however, the module of the same content was read out each time, and this resulted in the consumption of wasteful power.

The invention entitled "DATA PROCESSOR" described in JP-A-4-293124 employs a fundamental technique for saving the time required for reading out instructions, such as, a repeat module to be repeatedly accessed in each cycle from a program memory. According to the cited publication, in a data processor in which a memory storing a program is built in, one or more instruction registers are provided for storing an instruction module to be repeatedly executed, so that usually an instruction to be executed in each cycle is read out from the program memory (referred to hereinafter as an instruction memory) to be stored in a specific instruction register. However, when a repeat instruction for establishing an internal state required for repeated execution of the specific instruction is executed, the instruction read out from the instruction memory in the first loop is stored in the instruction registers whose number corresponds to the instruction module to be repeated and, in the second and succeeding loops, the specific instruction is not read out from the instruction memory, but the instruction code held in each of the instruction registers is directly read out so as to dispense with access to the instruction memory. The above manner of processing is advantageous in that the amount of power consumed for the memory access during execution of the corresponding part of the repeat module can be greatly decreased, so that the desired object of decreasing the power consumption can be attained.

SUMMARY OF THE INVENTION

However, the technique described above includes some restrictive conditions. Firstly, the number of the instruction steps specified by the repeat instruction to be repeatedly executed is limited by the number of the instruction registers. If the number of steps exceeds the number of the instruction registers that might be specified by the repeat instruction, the same number of instruction information in the initially stored instruction module would be shifted out by the excess steps specified by the repeat instruction and lost. As a result, the desired object cannot be attained under such circumstances. Secondly, the module to be repeated is not always in the form of a single loop and may have a multi nested loop structure. Because of the lack of consideration of such a situation, the module to be repeatedly executed is limited to a single loop. Thirdly, the instruction module to be repeatedly executed is identified on the basis of the result of decoding the specific repeat instruction read out immediately before the instruction module, and no consideration is given to a repeat instruction read out after the instruction module. Therefore, the above manner of processing cannot deal with a repeat instruction given by, for example, "if then go to".

The problems to be solved will now be discussed. Firstly, when the number of steps exceeding the number of the instruction registers is specified by the repeat instruction, the same number of instruction information in the initially stored instruction module is shifted out by the excess of the repeat instruction and lost. As a result, the number of the instruction steps to be repeatedly executed according to the specific repeat instruction is limited by the number of instruction registers, in the prior art case. Secondly, the module to be repeated is limited to a single loop only because no consideration has been given to the case where the module to be repeated has a multi nested loop structure. Thirdly, the prior art manner of processing cannot deal with a repeat instruction read out after the instruction module.

With a view to solve these prior art problems, it is an object of the present invention to provide a low-power data processor in which the memory access for execution of the repeat module is controlled so as to decrease the power consumption with high efficiency.

(1) An embodiment of the low-power data processor according to the present invention which attains the above object is featured in that an instruction module to be repeatedly executed is read out from an instruction memory to be fetched by an instruction fetch register and stored in an internal register, and, at the time of repeated execution of the instruction module, this instruction module is fetched by the instruction fetch register from the internal register so as to decrease the power consumption.

Figure 1:
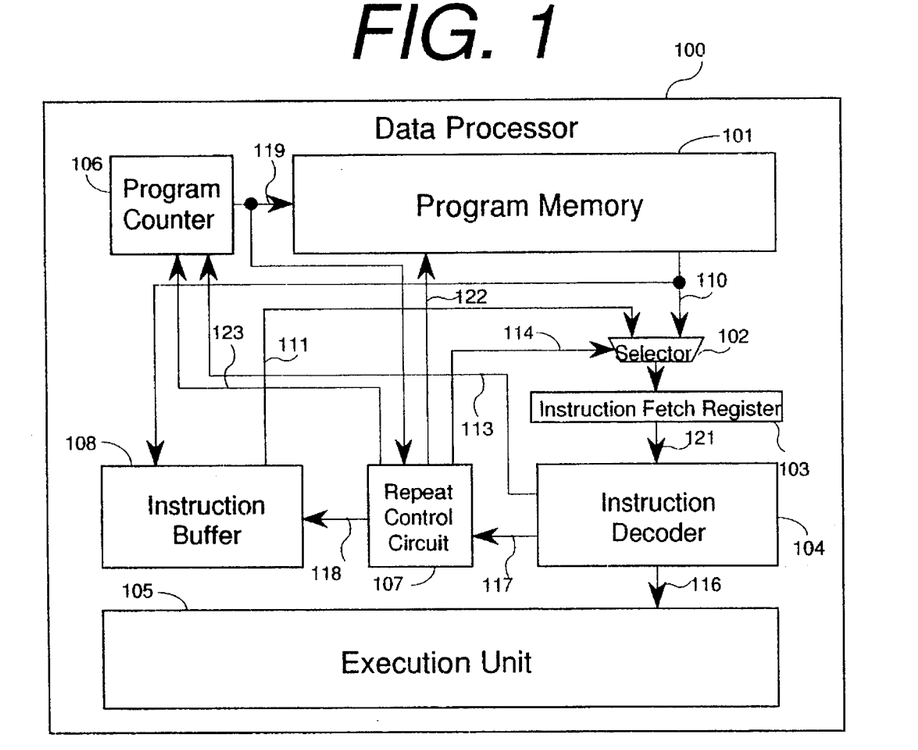
FIG. 1 is a block diagram showing the structure of an embodiment of the low-power data processor according to the present invention.

As shown in FIG. 1, the data processor embodying the present invention comprises an instruction buffer 108 storing an instruction module to be repeatedly executed, and a repeat control circuit 107 successively transferring each of the instructions in the instruction module to the instruction buffer 108 at the time of execution of the instruction module. When the number of the instructions in the instruction module to be repeatedly executed exceeds the capacity of the instruction buffer 108, storage of the remaining instructions in the instruction module to be repeatedly executed is ceased under control of the repeat control circuit 107 which stores information used for controlling reading of the instructions stored in the instruction buffer 108 to be repeatedly executed. From the next time of execution of the instructions in the instruction module, only the instructions stored still in the instruction buffer 108 to be repeatedly executed are fetched from the instruction buffer 108 by an instruction fetch register 103 under control of the repeat control circuit 107.

Figure 2:
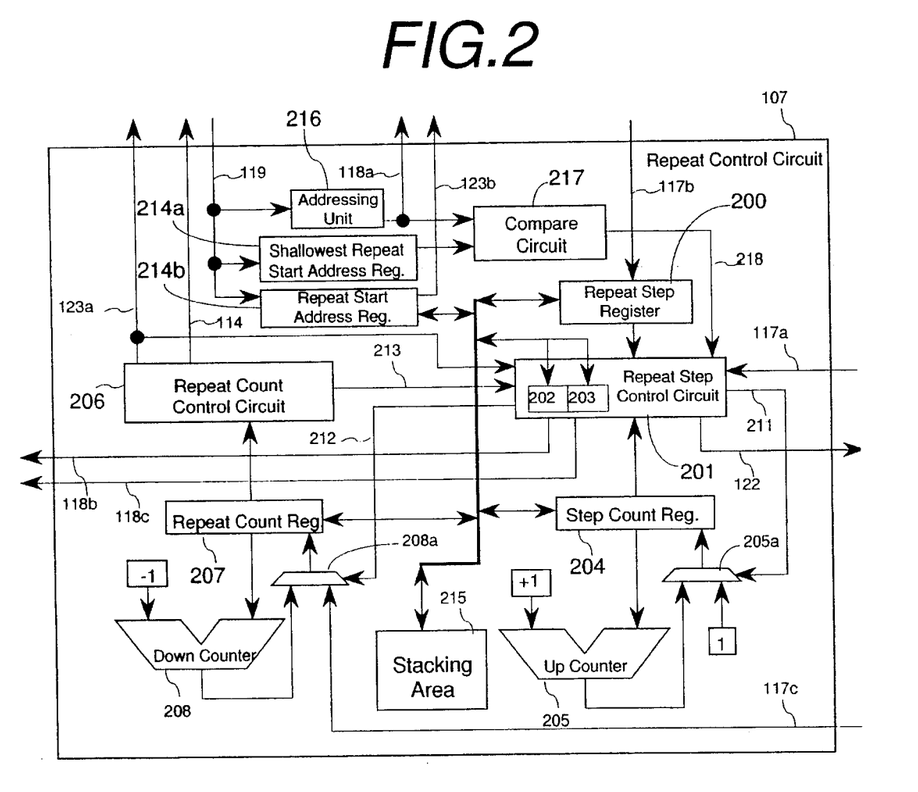
FIG. 2 is a block diagram showing the structure of one form of the repeat control circuit in the embodiment of the data processor of the present invention shown in FIG.1.

(2) The repeat control circuit 107 in the low-power data processor described in (1) comprises a stacking area 215 shown in FIG. 2 so that, when the instruction module to be repeatedly executed has a multi nested loop structure, and a new instruction module to be repeatedly executed is executed during storage of the preceding instruction module in the instruction buffer 108, control information for controlling reading of the preceding instruction module to be repeatedly executed can be transferred to be saved in the stacking area 215. Thus, the new instruction module to be repeatedly executed is transferred in a relation contiguous to the preceding instruction module, and, after execution of the new instruction module, the preceding instruction module is processed on the basis of the control information saved in the stacking area 215.

(3) In the low-power data processor described in (1) or (2), the instruction buffer 108 shown in FIG. 1 is in the form of a CMOS gate.

(4) The low-power data processor described in (1), (2) or (3) further comprises an instruction decoder 104 shown in FIG. 1. This instruction decoder 104 decodes a conditional branch instruction provided immediately after the instruction module to be repeatedly executed so as to specify a predetermined number of times of branching to the head address of the instruction module to be repeatedly executed. When this decoder 104 decodes the conditional branch instruction, the repeat control circuit 107 transfers this instruction module to the instruction buffer 108 at the next time of execution of the instruction module.

In the data processor according to the present invention, an instruction module to be repeatedly executed is stored in the instruction buffer and is then fetched by the instruction fetch register from the instruction buffer, thereby rendering unnecessary any need to make access to the instruction memory, so that consumption of power required for the access to the instruction memory can be decreased. When the number of instructions in the instruction module to be repeatedly executed exceeds the capacity of the instruction buffer, writing of the instruction module in the instruction buffer thereafter is stopped, and reading only of the remaining instructions in the module instructions from the instruction memory is effected in a usual manner. Upon completion of the first time of reading of the instruction module from the instruction memory, access to the instruction memory is immediately stopped, and, from the second and succeeding times, the required instructions to be repeatedly executed are read out from the instruction buffer. When the instructions that cannot be stored in the instruction buffer are to be then read out, access to the instruction memory is repeated again so as to read out such instructions in the usual manner. Thus, even when the number of the instructions in the instruction module to be repeatedly executed exceeds the capacity of the instruction buffer, the system is controlled so that at least the part of the instruction module that can be stored in the instruction buffer can only be read out from the instruction memory. By so controlling, restriction on the number of the instruction steps to be repeated can be avoided.

Further, when a new instruction module to be repeatedly executed is executed before the end of the preceding instruction module to be repeatedly executed is reached while the preceding instruction module is being executed and stored in the instruction buffer, the information held for repeat control is transferred to and saved in the stacking area before execution of the new instruction module. Then, as in the preceding case, that information is fetched so as to execute the new instruction module. In this case, the part of the preceding instruction module written in the instruction buffer in response to the repeat control is held in that form in the instruction buffer. Thus, even when the instruction module to be repeatedly executed may have a multi nested loop structure, the instruction buffer can effectively function.

The instruction buffer used in the present invention is a small-capacity buffer having a capacity sufficient to store all or part of the instruction module to be repeatedly executed. Actually, this instruction buffer is in the form of a device, such as, a CMOS gate operable with low power consumption, which can write and read data in and from each of the registers specified by a given address operand.

Further, when a program control instruction exists immediately after the instruction module so as to cause branching to the head address of the instruction module a predetermined number of times, the instruction module in the range of from the branched head address to the program control instruction is set as the instruction module to be repeatedly executed, and this instruction module to be repeatedly executed is stored in the instruction buffer at the time when the instruction module is read out from the instruction memory to be executed after the first branching. After the program control instruction is stored, the access to the information memory is immediately stopped, and from then the instruction module to be repeatedly executed is read out from the instruction buffer to be executed. Thus, the data processor can deal with the repeat instruction, such as, "if then go to" read out after reading the instruction module.

DESCRIPTION OF THE PREFERRED EMBODIMENTS

Preferred embodiments of the present invention will be described in detail by reference to the drawings.

FIG. 1 is a block diagram showing the structure of a low-power data processor embodying the present invention.

Referring to FIG. 1, the low-power data processor generally designated by the reference numeral 100 comprises a program counter 106 generating the address of an instruction to be read out, an on-chip instruction memory 101 storing programs to be executed, an instruction buffer 108 in the form of, for example, a CMOS gate provided according to the present invention for storing an instruction module (a repeat module) read out from the instruction memory 101 and repeatedly executed, a selector 102 selecting one of an output 110 from the instruction memory 101 and an output 111 from the instruction buffer 108, an instruction fetch register 103 for fetching and holding the instruction code selected by the selector 102, an instruction decoder 104 for decoding the fetched instruction code 121 to generate a control signal 116, an execution unit 105 for executing an arithmetic operation according to the instruction, and a repeat control circuit 107 for carrying out the necessary control, etc. according to the present invention in response to a repeat instruction representing information regarding the instruction module to be repeatedly executed.

In the low-power data processor having such a structure, the instruction code 110 read out from the instruction memory 101 in response to a program address signal 119 generated from the program counter 106 is passed through the selector 102 to be fetched by the instruction fetch register 103. The instruction code 121 outputted from the instruction fetch register 103 is decoded by the instruction decoder 104 to generate the control signal 116, and the execution unit 105 executes predetermined processing on the basis of the control signal 116. The repeat control circuit 107 and the instruction buffer 108 are maintained in their inactive state unless the repeat instruction is executed, and the selector 102 normally continues to select the output signal 110 from the instruction memory 101 under control of a control signal 114. The repeat instruction is provided immediately before the instruction module to be repeatedly executed so as to specify the number of steps the instruction module and the number of times of the execution is to be repeated.

As soon as the repeat instruction is decoded by the instruction decoder 104, the instruction decoder 104 transmits a control signal group 117 required for the repeat control to the repeat control circuit 107. Further, the instruction decoder 104 transmits a control signal 113 to the program counter 106 too so as to indicate that the repeat operation is started. In a system, such as that shown in the embodiment of the present invention, a pipeline process is commonly employed in many cases. When the repeat instruction is executed in such a case, the program counter 106 may not generate the program address signal 119 specifying the head address of the instruction module to be repeatedly executed, but will provide the address of the instruction executed earlier. Thus, in such a case, it is necessary to generate again the program address signal 119 specifying the head address of the instruction module repeatedly executed so that such an instruction module is to be stored in the instruction buffer 108. The control signal 113 is required for this purpose. Depending on the structure of the system, such manner of control may be unnecessary, and, in such a case, the control signal 113 is also unnecessary. This part of the control has not any direct concern with the present invention, and any desired control may be made without in any way limiting the scope of the present invention.

The program counter 106 detects the starting of the repeat operation upon receiving the control signal 113 and generates the program address signal 119 specifying the head address of the instruction module to be repeatedly executed again and makes access to the instruction memory 101. At the same time, the address data is also sent to the repeat control circuit 107 so that the address data is held in the repeat control circuit 107 as the information required for the repeat control. As soon as the last instruction in the instruction module to be repeatedly executed is read out, the above information is supplied to the program counter 106 as a signal 123 indicating the address of the foremost instruction. At the same time, the above information is used to compare the capacity of the instruction buffer 108 with the number of steps of the instruction module to be repeatedly executed.

An instruction enable signal 122 is normally maintained in its enable state, and the control signal 114 supplied to the instruction code selector 102 is normally maintained in a state for selecting the output signal 110 of the instruction memory 101. When the repeat instruction is executed, the instruction enable signal 122 is first maintained in the same state so as to read out the instruction module to be repeatedly executed from the instruction memory 101. However, in the second and succeeding steps, the required instruction code is supplied from the instruction buffer 108, and the instruction enable signal 122 is turned into its disable state so that access to the instruction memory 101 ceases. As a result, the control signal 114 is changed over to the control state in which the selector 102 selects the output signal 111 from the instruction buffer 108. Thereafter, the above state is maintained until the instruction module to be repeatedly executed is repeatedly executed by the specified number of times. After the repeated execution of the instruction module is ended, the control signal 114 is restored to its original state.

FIG. 2 is a block diagram showing the structure of one form of the repeat control circuit 107 in the embodiment of the data processor of the present invention shown in FIG. 1.

Referring to FIG. 2, the control signal group 117 supplied to the repeat control circuit 107 from the instruction decoder 104 shown in FIG. 1 consists of a control signal 117a indicating the starting of the repeat operation, an operand signal 117b indicating the number of steps of the instruction module to be repeatedly executed, and an operand signal 117c indicating the number of times of repeated execution of the instruction module. When the control signal 117a indicating the starting of the repeat operation is supplied to the repeat control circuit 107, a write enable flag 202 and a repeat control flag 203 used for controlling the instruction buffer 108 shown in FIG. 1 are set in a repeat step control circuit 201, and the entire repeat control circuit 107 and the instruction buffer 108 shown in FIG. 1 are activated. As a result, a write enable signal 118b is turned into its enable state, and data writing in the instruction buffer 108 shown in FIG. 1 is started.

First, in response to the program address signal 119 transmitted from the program counter 106 shown in FIG. 1, the head address of the instruction module to be repeatedly executed is set in registers 214a and 214b in the repeat control circuit 107. Also, the operand signal 117b indicating the number of repeat steps as transmitted from the instruction decoder 104 shown in FIG. 1 is set in a repeat step register 200, and the operand signal 117c indicating the number of times of repeated execution of the instruction module is set in a repeat count register 207. Also, by the combination of the repeat step control circuit 201 and a compare circuit 205a, an initial value "1" is set in a step count register 204, and, thereafter, the count of an up counter 205 is incremented by "+1" each time one step is advanced during processing.

The repeat step control circuit 201 continuously compares the content of the step count register 204 with that of the repeat step register 200. Coincidence of the content of the step count register 204 with that of the repeat step register 200 means the end of the first repeat step, and the content of the repeat count register 207 is decremented by "−1" by the combination of a down counter 208 and a compare circuit 208a. Further, the write enable flag 202 is cleared to turn the write enable signal 118b into its disable state. On the other hand, the read enable signal 118c is turned into its enable state so that the instruction buffer 108 shown in FIG. 1 is changed over to its read state.

In FIG. 2, the reference numeral 118a designates a register address signal supplied to the instruction buffer 108 shown in FIG. 1, and there are various practical methods for generating this register address signal 118a. When the instruction buffer 108 has a capacity expressed by an n-th power of two (2), the register address signal 118a can be easily obtained by directly supplying several less significant bits of the program address signal 119 generated from the program counter 106 shown in FIG. 1. For example, when the capacity of the instruction buffer 108 shown in FIG. 1 is 32 words, the five (5) least significant bits of the program address signal 119 generated from the program counter 106 shown in FIG. 1 are derived by an addressing unit 216 to provide the register address signal 118a to specify the address in the instruction buffer 108 shown in FIG. 1.

Figure 3:
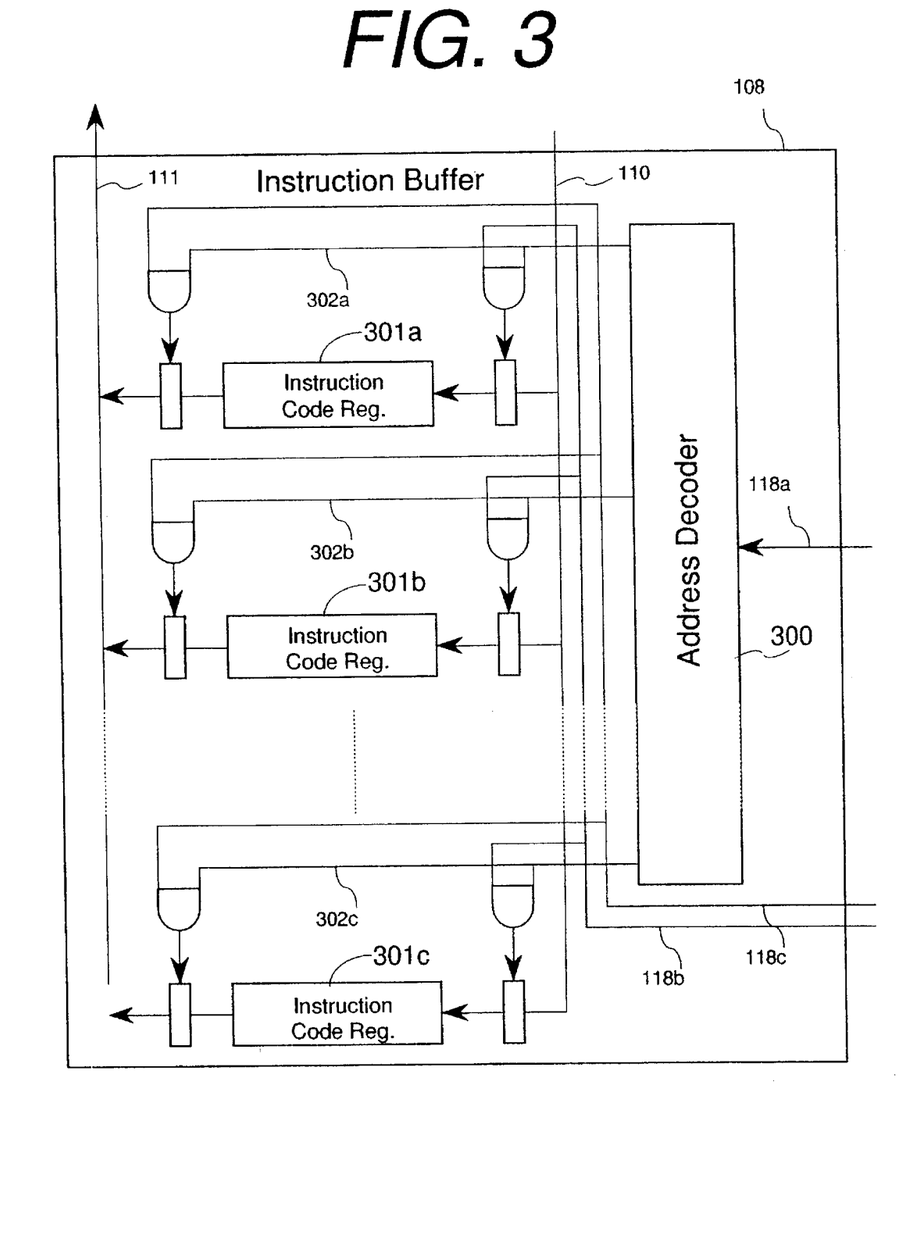
FIG. 3 is a block diagram showing the structure of one form of the instruction buffer in the embodiment of the data processor of the present invention shown in FIG. 1.

FIG. 3 is a block diagram showing the structure of one form of the instruction buffer 108 in the embodiment of the data processor shown in FIG. 1. The register address signal 118a supplied from the repeat control circuit 107 shown in FIG. 2 is decoded by an address decoder 300 to provide three address decode signals 302a, 302b and 302c. One of these address decode signals 302a to 302c is turned into its enable state so as to select the corresponding one of the instruction code registers 301a to 301c. When the instruction module to be repeatedly executed is first read out from the instruction memory 101 shown in FIG. 1, the write enable signal 118b supplied to the instruction buffer 108 shown in FIG. 1 is in its enable state as described already. Thus, the input side gate of the instruction code register selected by the address decoder 300 is turned on, and the instruction code output signal 110 is supplied to the selected instruction code register from the instruction memory 101 shown in FIG. 1.

In the case of the second and succeeding repeat steps, the write enable signal 118b supplied from the repeat control circuit 107 shown in FIG. 2 is in its disable state, and the output side gate of one of the instruction code registers 301a to 301c selected by the register address signal 118a is turned on so that the content of the instruction code register 301a, 301b or 301c is supplied as the instruction code output signal 111 to the selector 102 shown in FIG. 1. In this case, the selector 102 selects this instruction code output signal 111 to supply the instruction code output signal 111 to the instruction fetch register 103 shown in FIG. 1.

In the manner described above, in the case of the first repeat step, the instruction step to be repeatedly executed is read out from the instruction memory 101 shown in FIG. 1 to be supplied to the instruction fetch register 103 shown in FIG. 1 and, at the same time, it is written in the instruction buffer 108. In the case of the second and succeeding repeat steps, the instruction code is supplied from the instruction buffer 108 shown in FIG. 1 instead of from the instruction memory 101 shown in FIG. 1.

The operation of the system when the number of the instructions in the instruction module is larger than the capacity of the instruction buffer 108 shown in FIG. 1 will now be described by reference to FIG. 2.

In such a case, the repeat step control circuit 201 in the repeat control circuit 107 mainly participates in the processing. That is, when the number of the instructions in the instruction module to be repeatedly executed exceeds the capacity of the instruction buffer 108 shown in FIG. 1, the register address signal 118a indicates the register address in the instruction buffer 108 storing the foremost instruction in the instruction module to be repeatedly executed again before the coincidence is reached between the content of the repeat step register 200 and that of the step count register 204 in the state where the write enable flag 202 is set in the repeat step control circuit 201. The compare circuit 217 continuously compares the register address signal 118a with the content of the shallowest repeat start address register 214a storing the least significant data bits of the head address of the instruction module to be repeatedly executed. When coincidence is reached between them, an instruction overflow signal 218 indicating that the number of the instruction steps to be repeatedly executed is larger than the capacity of the instruction buffer 108 is supplied from the compare circuit 217 to the repeat step control circuit 201.

On the basis of this instruction overflow signal 218, the write enable flag 202 in the repeat step control circuit 201 is cleared to stop writing in the instruction buffer 108 shown in FIG. 1. Then, the content of the step count register 204 is counted up in the usual manner until the content of the step count register 204 coincides with that of the repeat step register 200. During this period, both the instruction buffer write enable signal 118b and the instruction buffer read enable signal 118c are in their disable state, so that the instruction buffer 108 shown in FIG. 1 ceases to operate. On the other hand, the instruction memory enable signal 122 supplied from the repeat step control circuit 201 is maintained in its enable state, so that the instruction memory 10 shown in FIG. 1 continues its reading operation.

As a result, even when the number of the instruction steps of the instruction module to be repeatedly executed exceeds the capacity of the instruction buffer 108 shown in FIG. 1, the instruction code for at least the part of the instruction module written in the instruction buffer 108 shown in FIG. 1 starting from the foremost instruction can be supplied from the instruction buffer 108 in the second and succeeding repeat steps. Although, in the illustrated embodiment of the present invention, the data held in the shallowest repeat start address register 214a is used to represent the head address of the instruction module to be repeatedly executed, it is apparent that similar control may be made even when the corresponding address provided by the addressing unit 216 may be held as the address in the instruction buffer 108 shown in FIG. 1.

In the period of the first repeat step control described above, the selector 102 shown in FIG. 1 acts to continuously select the output from the instruction memory 101 shown in FIG. 1 in response to the instruction code selector control signal 114 supplied from the repeat count control circuit 206 in the repeat control circuit 107. Also, the instruction memory enable signal 122 generated from the repeat step control circuit 201 maintains the instruction memory 101 shown in FIG. 1 in its enable state.

At the time of starting the second repeat step control, a repeat head address input control signal 123a is generated from the repeat count control circuit 206 in the repeat control circuit 107, and a repeat head address 123b held in the repeat start address register 214b is set in the program counter 106 shown in FIG. 1.

As described already, because the write enable flag 202 is now cleared, the write enable signal 118b is turned into its disable state, and, on the other hand, the read enable signal 118c is turned into its enable state, so that the instruction buffer 108 shown in FIG. 1 is now ready to start the reading operation. As a result, the selector 102 shown in FIG. 1 selects the instruction code output signal 111 appearing from the instruction buffer 108 shown in FIG. 1 in response to the instruction code selector control signal 114 supplied from the repeat count control circuit 206, and this signal 111 is inputted to the instruction fetch register 103 shown in FIG. 1.

The repeat control flag 203 is maintained in its set state in the second and succeeding repeat steps.

Also, the step count register 204 is cleared, and up-counting by the up counter 205 is started again.

The repeat step control circuit 201 continuously compares the content of the step count register 204 with that of the repeat step register 200. When coincidence is reached between them, it means the end of the second repeat step, and "−1" is decremented again from the content of the repeat count register 207 by the down counter 208. The instruction memory enable signal 122 supplied from the repeat step control circuit 201 turns the instruction memory 101 shown in FIG. 1 into its disable state, so that the memory access is stopped.

However, in the case where the number of the instruction steps to be repeatedly executed exceeds the memory capacity of the instruction buffer 108 shown in FIG. 1, the register address signal 118a, which is generated from the instruction buffer addressing unit 216 immediately after all the instructions held in the instruction buffer 108 are outputted from the instruction buffer 108, represents the register address of each of the instruction code registers 301a to 301c shown in FIG. 3 and storing the foremost instruction of the instruction module to be repeatedly executed. The repeat step control circuit 201 acts to turn the instruction memory enable signal 122 into its enable state, and the selector 102 shown in FIG. 1 is changed over to select the instruction code output signal 110 supplied from the instruction memory 101 shown in FIG. 1. Thus, as in the case of writing in the instruction buffer 108, the selector 102 operates to read out from the instruction memory 101 the remainder of the instruction steps to be repeatedly executed until the coincidence is reached again between the content of the step count register 204 and the repeat step register 200.

In the manner described above, when part of the instruction module to be repeatedly executed cannot be stored in the instruction buffer 108 shown in FIG. 1, the system is controlled so as to read out that part of the instructions from the instruction memory 101 shown in FIG. 1 in each of the repeat steps, so that the user can enjoy the effect of reduction of the power consumed by the instruction buffer 108 without the restriction of the number of the instruction steps to be repeatedly executed. Thereafter, similar processing is carried out until the content of the repeat count register 207 is decreased to "1". When the content of the repeat count register 207 is decreased to "1" already when the coincidence is reached between the content of the step count register 204 and that of the repeat step register 200, it means that the repeated execution of the specified instruction module is ended. Then, the repeat control flag 203 in the repeat control circuit 201 is cleared, and the selector 102 shown in FIG. 1 selects the instruction code output signal 111 supplied from the instruction memory 101 shown in FIG. 1 in response to the instruction code selector control signal 114 supplied from the repeat count control circuit 206. Also, the instruction memory 101 is turned into its enable state in response to the instruction memory enable signal 122, so that the routine instruction fetch operation is started again.

The operation of the system when the instruction module (the repeat module) to be repeatedly executed has a multi nested loop structure will now be described by reference to FIG. 2.

When the instruction module to be repeatedly executed has a multi nested loop structure, a new repeat instruction is executed in the state in which the repeat control flag 203 is set in the repeat step control circuit 201. At the time of execution of the new repeat instruction, the contents of the registers (the repeat step register 200, the step count register 204, the repeat count register 207 and the repeat start address register 214b) provided for repeat control purposes, and the states of both the write enable flag 202 and the repeat control flag 203 are saved in the stacking area 215 under control of the repeat control circuit 107. Thereafter, an initializing operation similar to that executed during execution of the first repeat instruction is executed. In this case, however, the content of the shallowest repeat start address register 214a only is maintained in the state held before the execution of the new repeat instruction.

The initial address of the new repeat instruction is held in the repeat start address register 214b, and each time the content of the step count register 204 coincides with that of the repeat step register 200, the count of the program counter 106 is returned to the head address of each repeat step. Because the instruction buffer 108 shown in FIG. 1 holds already some of instruction steps required for carrying out the first repeat operation, the area holding these instruction steps must be maintained until the control according to the first repeat instruction is completed.

If, without maintaining that area, the content of the instruction buffer 108 might be rewritten for storage of instruction steps to be repeated according to the new repeat instruction, the original first repeat operation could not be continued when the first repeat operation is to be restarted after the new repeat operation is completed. In order to solve such a problem, the shallowest repeat start address register 214a continues to hold its content stored during execution of the first repeat instruction even when a new repeat instruction is executed while the first repeat operation is being carried out.

When the register address signal 118a coincides with the least significant data held in the shallowest repeat start address register 214a before the content of the step count register 204 coincides with that of the repeat step register 200, the compare circuit 217 detects instruction overflow from the instruction buffer 108 and supplies that information to the repeat step control circuit 201. In response to that information, the repeat control circuit 201 clears the write enable flag 202 set for the purpose of controlling the instruction buffer 108, so that writing in the instruction buffer 108 is stopped. Thereafter, the manner of control similar to the operation carried out when the number of the instruction steps exceeds the capacity of the instruction buffer 108 is carried out.

In the case of a multi nested loop structure of more than 3 nested loops, the operation may be similar to that carried out for the 2nd nested loop. This is because, in the case of the 2nd nested loop too, the instruction steps are similarly guarded by the value of the content of the shallowest repeat start address register 214a.

In the case of the 2nd and succeeding nested loops, all the instruction steps to be repeatedly executed are written already in the instruction memory 108 shown in FIG. 1 during the first repeat operation. Therefore, when the repeat instruction is to be executed in the case of the 2nd and succeeding nested loops, the operation for writing in the instruction buffer 108 is now unnecessary. On the other hand, in the illustrated embodiment of the present invention, the write enable flag 202 for controlling the instruction buffer 108 is set each time the repeat instruction is executed in the case of the 2nd and succeeding nested loops. However, this is merely a redundant operation and does not provide any special problem. When the user wishes to dispense with such a redundant operation so as to further improve the effect of reducing the power consumption, the instruction buffer write enable flag 202 to deal with the first repeat operation and the same flag 202 to deal with the repeat operation in the case of the 2nd and succeeding nested loops are preferably prepared, and the write enable flag 202 to deal with the first repeat operation is preferably continuously held, so that the redundant operation required for data writing in the instruction buffer 108 can be made unnecessary at the time of execution of the repeat instruction following the first repeat instruction in the 2nd and succeeding nested loops.

The foregoing description is based on the premise that, in the data processor according to the present invention, a repeat instruction specifying the number of instruction steps and the number of times of repeating the instruction steps is provided immediately before an instruction module to be repeatedly executed. However, the provision of such a repeat instruction is not necessarily essentially required in the present invention. When, for example, a conditional branch instruction instructing branching, by a specified number of times, to the head address of the instruction module to be repeatedly executed is provided, the decoder 104 shown in FIG. 1 decodes this conditional branch instruction instead of the repeat instruction. In this case, the requirement for repeated processing is detected immediately after execution of the instruction module to be repeatedly executed. Therefore, execution of the instruction module in the first repeat step has already been completed before execution of the conditional branch instruction. In the second repeat step, the operation for data writing in the instruction buffer 108 is repeated, so that, from the third and succeeding repeat steps, the operation for data reading from the instruction memory 101 can be dispensed with, and the power consumption by the instruction memory 101 can be correspondingly decreased.

As described by reference to FIG. 1 to 3, the capacity of the instruction buffer 108 used in the data processor of the present invention is not required to be so large and may be equal to the number of steps of one repeat module unlike the program memory, so that the instruction buffer may be in the form of a CMOS-gate register file consuming a very small amount of power, and the power consumption of the instruction buffer can be greatly decreased. Therefore, when the capacity of the instruction buffer 108 and the number of steps of the instruction module to be repeatedly executed are suitably managed, and also even when a repeat module having the number of steps exceeding the capacity of the instruction buffer may be used, the effect of decreasing the power consumption can be sufficiently exhibited at the part corresponding to the capacity of the instruction buffer. Further, even when the instruction module to be repeatedly executed may have a multi nested loop structure, the system is to be controlled so that, at the time of execution of the instructions in the 2nd and succeeding loops, the part of the instructions written already in the instruction buffer 108 in the first repeat step can be held. Thus, the present invention can be applied to a program of multi nested loop structure.

It is apparent that the present invention is in no way limited to the embodiment described by reference to FIGS. 1 to 3, and various changes and modifications may be made without departing from the scope of the subject matter. For example, in FIG. 2, the combination of the up counter 205 and the compare circuit 205a constitutes the control part for counting the number of steps of the instruction module to be repeatedly executed. However, the content of the repeat step register 200 may be down counted each time the operand signal 117b indicating the number of repeat steps is supplied, and when the register content is decreased to "1" the system decides that the first repeat step is ended. In each of the second and succeeding repeat steps, the operand signal 117c indicating the number of steps held in the repeat step register 200 may be transferred to the step count register 204 so as to repeat down counting again.

Further, although the down counter 208 is used in FIG. 2 to form the circuit part for controlling the number of times of repeating, it is apparent that such a circuit part may be formed by the combination of an up counter and a compare circuit. Also, in the illustrated embodiment, the operand signal 117b indicating the number of steps of the instruction module to be repeatedly executed is used to control, by means of the down counter 208, the number of steps of writing and reading in and from the instruction buffer 108. However, at the time of execution of the repeat instruction, the rearmost address of the instruction module to be repeatedly executed may be calculated and held on the basis of the head address of the instruction module to be repeatedly executed, which address is fetched by the repeat start address register 214b, and the operand signal 117b indicating the number of steps of the instruction module to be repeatedly executed. The signal indicating this address is compared with the program address output signal 119 from the program counter 106 shown in FIG. 1, and, when they coincide with each other, the system determines that the repeat operation in that repeat step has ended.

Further, the repeat control circuit 107 shown in FIG. 1 need not necessarily be in the form of an independent circuit block. Because the repeat control circuit 107 is closely involved with the generation of the program address signal 119, the repeat control circuit 107 may be integrally combined with the program counter 106 to form a single circuit block. Also, the instruction buffer 108 need not be independent of the instruction fetch register 103, and it is apparent that generally a specific one of the internal registers of the instruction buffer 108 may be constructed to exhibit the function of the instruction fetch register 103. Further, in the illustrated embodiment of the present invention, the operation using the instruction memory 101 built in the data processor 100 has been described, by way of example. However, the built-in instruction memory 101 need not necessarily store all the programs, and part of the programs may be stored in an external memory.

According to the present invention, even when the number of steps exceeding the number of the instruction registers in the instruction buffer 108 may be specified by the repeat instruction, the number of instruction information in the initially stored instruction group which is the same as the excess of the instruction steps specified by the repeat instruction is never shifted out and lost, so that the number of the instruction steps to be repeatedly executed, as specified by the repeat instruction, is not limited by the number of the instruction registers. Also, the module to be repeated is not limited to a single loop only, but can also deal with a multi nested loop structure. Further, the present invention can also deal with a repeat instruction read out immediately after the instruction module to be repeatedly executed. Therefore, the desired reduction of the power consumption of the low-power data processor by memory access control of the repeat module can be achieved with high efficiency.

What is claimed is:

1. A low-power data processor in which an instruction module to be repeatedly executed is read out from an instruction memory and fetched by an instruction fetch register in such a way as to decrease the power consumption of the processor, said data processor comprising:

an on-chip instruction buffer for storing only at least a part of the instructions of an instruction module to be repeatedly executed; and repeat control means for successively transferring the instructions in said instruction module from said instruction memory to said instruction buffer as well as to said instruction fetch register at the first time of execution of said instruction module, and, when the number of the instructions of said instruction module to be repeatedly executed as stored in said instruction buffer equals the capacity of said instruction buffer, stopping storage of the remaining instructions of said instruction module in said instruction buffer while continuing to transfer the remaining instructions to said instruction fetch register from said instruction memory and storing information used for controlling reading of each of the instructions stored in said instruction buffer, including means operating during each subsequent time of execution of the instructions of said instruction module for transferring the instructions stored in said instruction buffer to said instruction fetch register only from said instruction buffer and for transferring the remaining instructions which are not stored in said instruction buffer to said instruction fetch register from said instruction memory, on the basis of said stored reading control information.

2. A low-power data processor according to claim 1, wherein said instruction buffer is formed of CMOS gates.

3. A low-power data processor according to claim 2, further comprising a decoder for decoding a conditional branch instruction provided immediately after said an instruction module to be repeatedly executed for specifying a predetermined number of times of branching to the head address of said instruction module to be repeatedly executed, and, when said decoder decodes said conditional branch instruction, said repeat control means transfers said instruction module to said instruction buffer at the next time of execution of said instruction module.

4. A low-power data processor according to claim 1, further comprising a decoder for decoding a conditional branch instruction provided immediately after an instruction module to be repeatedly executed for specifying a predetermined number of times of branching to the head address of said instruction module to be repeatedly executed, and, when said decoder decodes said conditional branch instruction, said repeat control means transfers said instruction module to said instruction buffer at the next time of execution of said instruction module.

5. A low-power data processor in which instruction modules to be repeatedly executed and having a multi-nested loop structure are read out of an instruction memory and fetched by an instruction fetch register in such a way as to decrease the power consumption of the processor, said data processor comprising:

an on-chip instruction buffer for storing only instructions of said instruction modules to be repeatedly executed and having a multi-nested loop structure; and control means for successively transferring the instructions of a first instruction module of the multi-nested loop structure to said instruction buffer as well as to said instruction fetch register at the time of execution of said first instruction module, including a stacking area to which, when a second instruction module to be repeatedly executed is executed during the storage of said first instruction module in said instruction buffer, control information for controlling reading of said first instruction module to be repeatedly executed is transferred and saved in said stacking area, means for transferring said second instruction module to said instruction buffer in a relation contiguous to the instructions of said first instruction module stored already in said instruction buffer, and means responsive to completion of execution of said second instruction module for continuing the execution of said first instruction module on the basis of said control information saved in said stacking area.

6. A low-power data processor according to claim 5, wherein said instruction buffer is formed of CMOS gates.

7. A low-power data processor according to claim 6, further comprising a decoder for decoding a conditional branch instruction provided immediately after an instruction module to be repeatedly executed for specifying a predetermined number of times of branching to the head address of said instruction module to be repeatedly executed, and, when said decoder decodes said conditional branch instruction, said control means transfers said instruction module to said instruction buffer at the next time of execution of said instruction module.

8. A low-power data processor according to claim 5, further comprising a decoder for decoding a conditional branch instruction provided immediately after an instruction module to be repeatedly executed for specifying a predetermined number of times of branching to the head address of said instruction module to be repeatedly executed, and, when said decoder decodes said conditional branch instruction, said control means transfers said instruction module to said instruction buffer at the next time of execution of said instruction module.

* * * * *